United States Patent
Schlienger

[15] 3,651,238
[45] Mar. 21, 1972

[54] ARC FURNACE ELECTRODE WHEEL MOUNTING SYSTEM

[72] Inventor: Max P. Schlienger, 19 Rollingwood Drive, San Rafael, Calif. 94901

[22] Filed: July 17, 1970

[21] Appl. No.: 55,869

[52] U.S. Cl. .......................................... 13/9, 13/15, 13/18
[51] Int. Cl. ...................................... H05b 7/10, H05b 7/12
[58] Field of Search ............................... 13/10, 18, 9, 14, 15

[56] References Cited

UNITED STATES PATENTS

| | | | |
|---|---|---|---|
| 1,378,972 | 5/1921 | Moore | 13/10 |
| 2,406,147 | 8/1946 | Hopkins | 13/10 |
| 2,958,719 | 11/1960 | Beecher | 13/10 X |
| 3,420,939 | 1/1969 | Schlienger | 13/18 |

Primary Examiner—Bernard A. Gilheany
Assistant Examiner—R. N. Envall, Jr.
Attorney—Townsend and Townsend

[57] ABSTRACT

An arc furnace having a rotating electrode wheel which is pivotably and extendably mounted to permit arc formation in any desired area of the melt. Preferably, the electrode wheel mounting structure is disposed outside of the vertical projection of the melt, so that the electrode wheel will be inclined with respect to the melt regardless of the position of the electrode wheel with respect thereto. Furthermore, the electrode wheel may be so mounted adjacent the pouring end of the crucible, so that when the crucible is poured, the electrode wheel may be positioned for arc heating during pouring. In addition, a consumable electrode may be provided and may be employed simultaneously with, or instead of, the electrode wheel.

10 Claims, 2 Drawing Figures

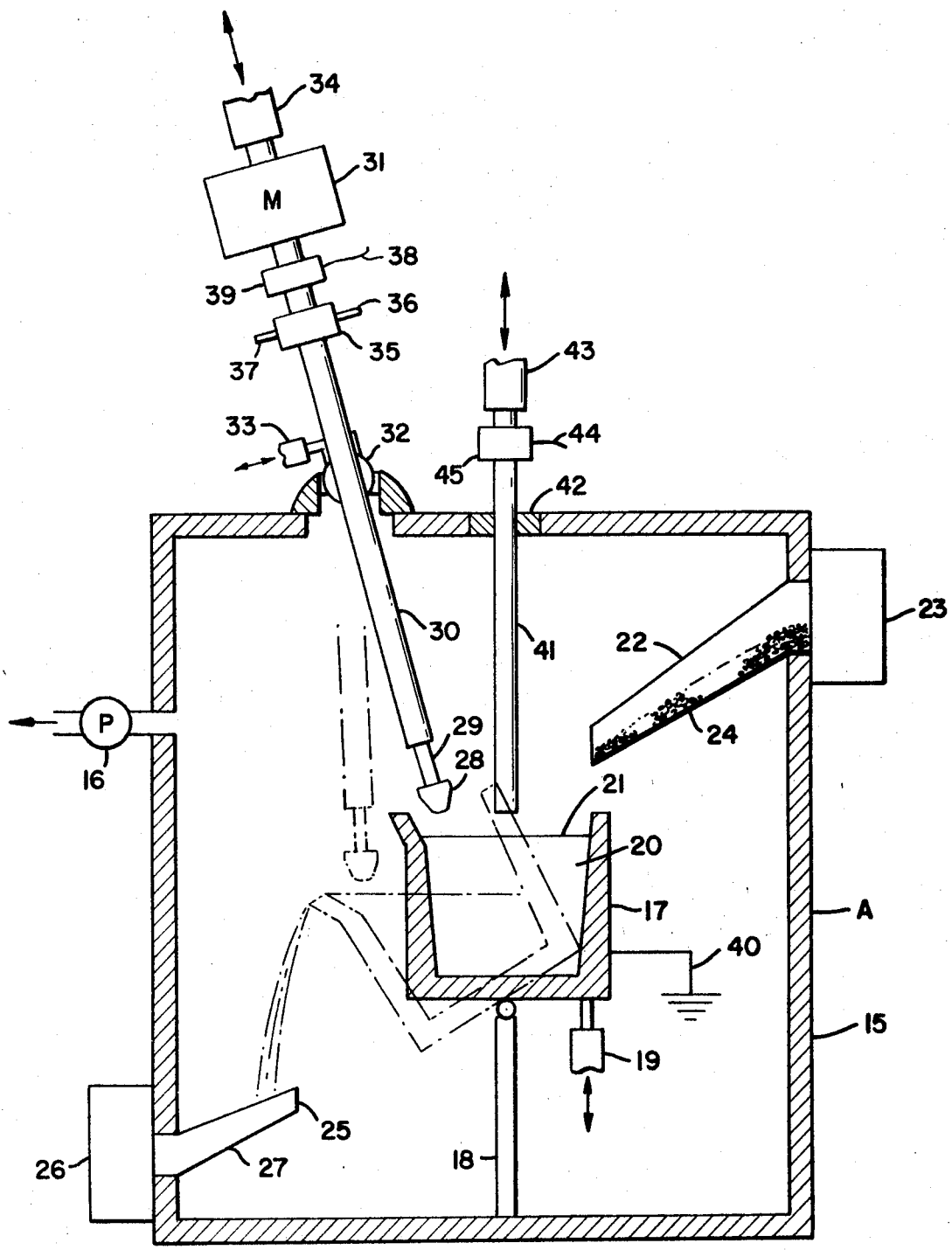
FIG_1

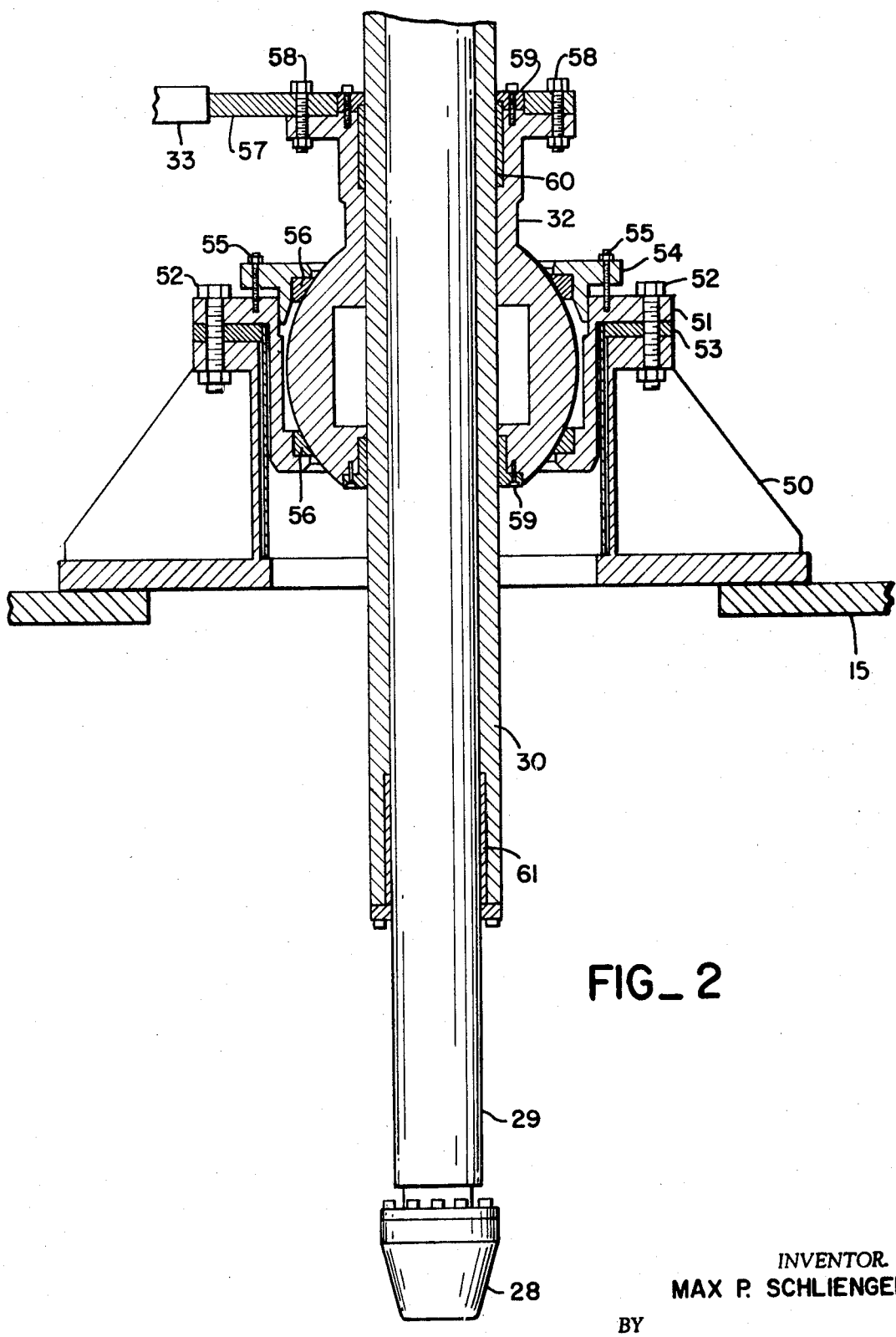
FIG_2

ARC FURNACE ELECTRODE WHEEL MOUNTING SYSTEM

This invention relates to an arc furnace electrode wheel mounting system.

Arc furnaces generally incorporate a melt and a electrode which is arranged to establish an arc to the melt in order to create a sufficient temperature gradient to melt materials within an evacuated or controlled atmosphere chamber. One commonly employed technique utilizes a previously molded, consumable electrode in which the electrode itself constitutes the material which is to be melted. This technique, however, requires that the work material be previously formed in an electrode shape. In other applications where scrap, powder, or sponge material is to be melted, a nonconsumable electrode must be employed to create the requisite arcs. Such nonconsumable electrodes when appropriately cooled can function to provide the arc which maintains the melt at a sufficient temperature gradient to melt the scrap powder or granular materials being added to the melt. However, the heat at the electrode tip causes severe erosion of the tip which in the case of higher temperature applications renders such a technique difficult. This is particularly true where the refractory and reactive metals such as columbium, molybdenum, tungsten, zirconium and titanium are to be treated.

According to applicant's prior inventions, disclosed in U.S. Pat No. 3,420,939, issued Jan. 7, 1969 and No. 3,461,214, issued Aug. 12, 1969, these problems are overcome by providing a novel wheel-shaped electrode mounted for rotation in proximity to the melt. After one or more arcs are established between the wheel and the melt, the wheel is rotated, causing the arcs to originate from changing portions of the surface of the rotating electrode. Cooling is applied over the surface of the wheel to maintain the electrode at a sufficiently low temperature to allow high temperature arc-melting to occur without electrode destruction.

Applicant has found certain disadvantages of the electrode structures according to his previous inventions. With respect to the electrode structure according to applicant's prior invention disclosed in U.S. Pat. No. 3,420,939, applicant has discovered that when the electrode wheel is mounted with its axis parallel to the axis of the crucible, and thus with the arc forming periphery of the electrode wheel equi-distant from the upper surface of the melt, the arcs produced therefrom may not remain stationary, but may rotate with the electrode wheel. This may result in the arc originating from a fixed location on the electrode wheel, causing the electrode wheel to deteriorate. Accordingly, it is desirable for the electrode wheel to be somewhat inclined with respect to the surface of the melt.

With respect to the electrode structures according to either applicant's prior inventions disclosed in U.S. Pat. Nos. 3,461,214 or 3,420,939, the electrode wheel is rotatably mounted in a fixed position above the surface of the melt, thereby restricting the region of arc formation to an area of the surface of the melt in proximity with the electrode. Since the location of the electrode is fixed, it is possible to have certain areas of the melt where no arc formation is possible, thus resulting in cold spots in the melt. Furthermore, the fixed mounting of the electrode unduly limits the mobility of the crucible, since the surface of the melt must be constantly maintained in proximity to the fixed electrode, thereby requiring a crucible capable of movement to maintain the surface of the melt in arc forming proximity with the electrode. In addition, pivotal movement of the crucible necessary to pour out the melted material therein is restricted by the electrode mounted rigidly above. Another disadvantage of the electrodes according to applicant's previous inventions is the fact that the electrode, when fixedly mounted, must be of considerable size in order to provide the capability of arc formation over substantially all of the surface of the melt, thereby unduly restricting entry of work material into the melt. Specifically, the work material must be of a size suitable for passage between the electrode wheel and the edge of the melt. With a large electrode wheel, suitable processing of work material is required in order to prevent the work material from interfering with the action of the electrode wheel. Similarly, the substantial size of the electrode wheel required by the applicant's previous inventions prohibits the use of an alternative consumable electrode in the arc furnace, as the surface of the melt is substantially occupied by the electrode wheel.

It is, therefore, an object of the present invention to provide an arc furnace having a rotating electrode wheel that is pivotably and extendably mounted.

Another object of the present invention is to provide an arc furnace having a rotating electrode wheel that is pivotably and extendably mounted by a mounting structure that is outside of the vertical projection of the crucible, so that the electrode wheel will be inclined with respect to the melt regardless of the position of the electrode wheel with respect thereto.

Still another object of the present invention is to provide an arc furnace having a rotating electrode wheel and a consumable electrode, which electrodes may be employed simultaneously or substitutionally.

These and other objects, features and advantages of the present invention will be more readily apparent from the following detailed description, with reference to the accompanying drawings, wherein:

FIG. 1 is a diagrammatic view showing an arc furnace incorporating a principle embodiment of the present invention; and FIG. 2 is a cross-sectional view of the electrode mounting structure shown in FIG. 1.

Referring initially to FIG. 1, there is provided an arc furnace A formed with an enclosure or housing 15 and having an evacuation pump mechanism 16 adapted to withdraw gas from the housing. By this means, the interior of housing 15 can be maintained under high vacuum conditions, the exact pressure of which is determined by the materials to be worked on and the proposed nature of their treatment. A crucible 17 is pivotally mounted to a support 18 in the interior of housing 15. Crucible 18 is pivoted by a propulsion device 19 on demand. A melt 20, having an upper surface 21, is contained within crucible 17. The aforesaid melt forming structure is common in the art and is illustrated in the present form for illustrative purposes only, it being understood that the invention can be combined with other forms of work supporting devices.

Materials to be melted can be fed into melt 20 by conventional means. One illustration of such is shown in FIG. 1, in which a chute 22 is fed materials through an air lock mechanism 23. The termination of chute 22 is arranged to drop work material, shown at 24 into crucible 17.

Similarly, melted material can be exited from melt 20 by conventional means. One illustration of such is shown in FIG. 1, in which a chute 25 is connected to an air lock mechanism 26. The termination of chute 25 is arranged so that melted material 27 will be poured into chute 25 when crucible 17 is pivoted by propulsion device 19.

The electrode structure of the present invention is pivotably and extendably mounted from housing 15 and primarily includes an electrode wheel 28. Electrode wheel 28 may be of the construction disclosed in applicant's copending patent application entitled "Centrifugally Cleaned Arc Furnace Electrode Wheel," filed July 17, 1970, Ser. No. 55,869. Electrode wheel 28 is attached to a shaft 29, which is rotatably mounted in a sleeve 30. Shaft 29 extends through sleeve 30 to the exterior of housing 15. Shaft 29 is therein driven by a motor 31 mounted on the external end of shaft 29. Thus, movement of motor 31 causes rotation of shaft 29 and concurrent rotation of electrode wheel 28.

Sleeve 30 is slidingly engaged in a ball joint 32, pivotally mounted to housing 15. Ball joint 32 serves to support sleeve 30 while electrically insulating sleeve 30 from the housing 15. A propulsion device 33 is attached to ball joint 32, so that ball joint 32 may be pivoted on demand. A propulsion device 34 is attached to motor 31, so that sleeve 30 may be retracted from, or extended into, the interior of housing 15, on demand.

In a preferred embodiment of the present invention, ball joint 32 is pivotally mounted to housing 15 outside of the vertical projection of crucible 15 so that ball joint 32 is not directly over crucible 15, and is thus not subjected to the extreme heat and the vaporized or sputtered melt material present there. Furthermore, such mounting insures that electrode wheel 28 will be inclined with respect to the upper surface 21 of melt 20 regardless of the position of electrode wheel 28 with respect thereto. Preferably, ball joint 32 is suitably mounted so that the axis of electrode wheel 28 will be inclined at approximately a 20° angle to the axis of crucible 17 when electrode wheel 28 is positioned over the center of crucible 17. In addition, ball joint 32 may be mounted adjacent the pouring edge of crucible 15, to facilitate arc heating of the melt during the pouring operation in a manner to be described hereinafter.

Water or other liquid coolant media is transmitted to, and exited from, electrode wheel 28 through a fluid or water intake manifold 35 mounted on shaft 29 externally of housing 15. This is accomplished through an inlet pipe 36 which is directed through manifold 35 into fluid communication through shaft 29 with electrode wheel 28. Exhaust is then accomplished through shaft 29, manifold 35 and thence out the exhaust pipe 37. The water or other fluid supply system for handling the entry and exit at conduits 36 and 27, as well as motor 41, is maintained in electrical isolation from housing 15.

A source of high energy electrical power is provided at electrical terminal 38 and is connected by a coupling 39 to shaft 29 for transfer of the electrical energy to the conductive body of electrode wheel 28. The opposite pole of the aforesaid electrical energy is connected by ground 40 to crucible 17, thereby establishing a grounded polarity at melt 20. This obviously establishes a high energy potential difference between the electrode wheel 28 and the melt 20.

A consumable electrode 41 may also be provided. Consumable electrode 41 is slidingly engaged in an insulating bushing 42, so as to extend to the exterior of housing 15. A propulsion device 43 is attached to the end of consumable electrode 41, so as to retract or extend consumable electrode 41, on demand. The source of high energy electrical power is also connected to terminal 44 of coupling 45 for transfer to the consumable electrode 41. Similarly, a high energy potential difference exists between consumable electrode 41 and the crucible 17. Consumable electrode 41 may be operated simultaneously with, or in place of, electrode wheel 48, in a manner to be described hereinafter.

Referring now to FIG. 2, the mounting of the electrode wheel according to the present invention will now be described in detail. A mounting bracket 50 is attached to housing 15 about an opening therein. A lower ball joint housing 51 is secured within bracket 50 by a plurality of bolts 52. An insulating collar 53 is disposed between lower ball joint housing 51 and bracket 50 to electrically insulate lower ball joint housing 51 and thus electrode wheel 28 from housing 15.

An upper ball joint housing 54 is attached to lower ball joint housing 51 by a plurality of bolts 55. Upper ball joint housing 54 and lower ball joint housing 51 cooperate to form a mounting structure for ball joint 32. A pair of annular bearings 56 are disposed between ball joint 32 and upper ball joint housing 55 and lower ball joint housing 51, respectively. In this manner, ball joint 32 is pivotally mounted to housing 15.

A collar member 57 is attached to ball joint 32 by a plurality of bolts 58. Propulsion device 33 is attached to collar member 57, so that ball joint 32 will be pivoted in response to the movement of propulsion device 33. In this manner, ball joint 32 and thus electrode wheel 28 may be pivoted on demand.

Sleeve 30 is slidingly engaged in a passage in ball joint 32. A pair of bearings 59 are provided to readily permit the sliding of sleeve 30 within the passage in ball joint 32. In addition, a suitable packing 60 is disposed between the passage in ball joint 32 and sleeve 30 to prevent air leakage therethrough. In this manner, sleeve 30 is slidingly engaged with ball joint 32, thus permitting sleeve 30 and thus electrode wheel 28 to be extended or retracted into the arc furnace in response to propulsion device 34.

Shaft 29 of electrode wheel 28 is rotatably mounted within sleeve 30. A suitable packing 61 is provided between sleeve 30 and shaft 29 to prevent the leakage of air therethrough. Shaft 29 is drivingly engaged with motor 31, so that the movement of motor 31 will cause the rotation of shaft 29 within sleeve 30, and the concurrent rotation of electrode wheel 28.

Accordingly, electrode wheel 28 is rotatably suspended from housing 15 by the apparatus thus described. Furthermore, the position of electrode wheel 28 within the housing may be varied upon operation of propulsion devices 33 or 34. Specifically, propulsion device 33 will vary the angular alignment of electrode wheel 28, while propulsion device 34 will extend or retract electrode wheel 28 within housing 15. Such extendable and pivotal mounting, and the variable placement of electrode wheel 28 thus provided, is advantageous in that it permits the electrode wheel to be moved over the surface of the melt so as to vary the region of arc formation. Furthermore, the electrode wheel may thus be positioned at an appropriate location to permit the simultaneous or substitutional use of consumable electrode 41. In addition, the electrode wheel position may be altered to permit the addition of large pieces of work material to the melt, and to permit alignment of the electrode wheel with the melt during the pouring operation.

Referring again to FIG. 1, the operation of an arc furnace according to the present invention will now be described. Work material 24 is fed into crucible 17 through the air lock valve 23. Pump 16 is actuated to maintain the interior of housing 15 at an appropriate vacuum. Propulsion devices 33 and 34 are operated to align electrode wheel 28 above the surface of the melt 21 in arc forming proximity therewith. Motor 31 is energized to rotate electrode wheel 28.

Electrical energy is applied at terminal 38 and ground 40 at sufficient intensity to cause an arc to be developed from a small area on the peripheral portion of electrode wheel 28 to the top or upper surface 21 of melt 20. The arc, of course, raises the temperature to a level sufficient to cause the work material 24 to form the molten bath or melt 20. The rotation of electrode wheel 28 continually changes the area of the wheel from which the arc emanates. Thus, while an arc is being formed from only a few degrees of the peripheral portion of electrode wheel 28, the entire peripheral portion thereof is cooled by the flow of coolant liquid therethrough. This causes a large area for heat dissipation and a small area for arc formation, thereby preventing electrode wheel deterioration.

As the work material 24 is melted, additional work material 24 may be added through air lock 23. Electrode wheel 28 may be repositioned during such adding of work material by actuation of propulsion devices 33 or 34, to thereby permit large pieces of work material 24 to enter crucible 17 without interference from electrode wheel 28.

As the size of melt 20 increases, or in other words, as crucible 17 is filled with molten material, electrode wheel 28 may be repositioned to produce arcs over any desired portion of the upper surface 21 of melt 20, upon actuation of propulsion devices 33 or 34. Furthermore, propulsion devices 33 and 34 are employed to maintain electrode wheel 28 in arc forming proximity with the upper surface 21 of melt 20, as the crucible fills.

As the above described melting operation proceeds, consumable electrode 41 may be substituted for electrode wheel 28 or may be operated concurrently therewith. For example, electrical energy may be applied to terminal 44, and propulsion device 43 may be actuated to place the tip of consumable electrode 41 in arc forming proximity with the upper surface 21 of melt 20, causing an arc to form therebetween. Of course, electrode wheel 28 may be operated simultaneously therewith, or may be removed from arc forming proximity upon actuation of propulsion devices 33 and 34.

When melt 20 substantially fills crucible 17, crucible 17 may be pivoted upon actuation of propulsion device 19 to pour the melt 20 contained therein into chute 25, from which the molten material 27 may exit the arc furnace through air lock 26. During this pouring operation, electrode wheel 28 may be suitably positioned over the mouth or lip portion of crucible 17 by appropriate actuation of propulsion devices 33 and 34. Such an orientation of crucible 17 and electrode wheel 28 is depicted in dashed outline in FIG. 1. Such positioning of electrode wheel 28 over the lip or mouth of crucible 17 is advantageous in that an arc will be formed between electrode wheel 28 and melt 20, as the molten material 27 is poured from crucible 17. The arc thus produced will facilitate the pouring operation by insuring that the material being poured is at a sufficient temperature to readily flow.

Of course, these procedures may be suitably varied to suit the particular arc furnace configuration and work material to be employed. Specifically, while the subject invention is shown in combination in a furnace application for melting granular materials, it is to be understood that the electrode mounting system according to the present invention can be used with other types of furnace applications which are known in the art.

While a particular embodiment of this invention has been shown and described, it will be apparent that other adaptations and modifications can be made without departing from the true spirit and scope of this invention, as set forth in the claims.

What is claimed is:

1. In a melting and casting arc furnace of the type having an enclosed housing forming a controlled ambient atmosphere, a crucible mounted in said housing in which conductive meltable material is to be melted, and a rotating nonconsumable electrode wheel in which an arc is drawn between the electrode wheel and the conductive meltable material in said crucible, the improvement comprising: means pivotably and means extendably mounting said electrode wheel within said housing to permit positioning of said electrode wheel over any desired area of said crucible.

2. Apparatus according to claim 1 further comprising a consumable electrode, an arc being drawn between said consumable electrode and the conductive meltable material in said crucible.

3. Apparatus according to claim 2 further comprising means extendibly mounting said consumable electrode within said housing and propulsion means for extending said consumable electrode in arc-forming proximity with the conductive meltable material in said crucible on demand.

4. In a melting and casting arc furnace of the type having an enclosed housing forming a controlled ambient atmosphere, a crucible mounted in said housing in which conductive meltable material is to be melted, and a rotating nonconsumable electrode wheel in which an arc is drawn between the electrode wheel and the conductive meltable material in said crucible, the improvement comprising: mounting means including means pivotably and means extendably mounting said electrode wheel within said housing, said mounting means being disposed outside of the vertical projection of said crucible to permit positioning of said electrode wheel over any desired area of said crucible with said electrode wheel angularly inclined with respect to said crucible.

5. Apparatus according to claim 4 wherein said mounting means is suitably disposed to angularly incline the axis of said electrode wheel approximately 20° with respect to the axis of said crucible when said electrode wheel is positioned over the center of said crucible.

6. Apparatus according to claim 4 comprising means pivoting said crucible on demand for pouring the melted material in said crucible, said mounting means being disposed adjacent the region of the edge of said crucible from which melted material is poured when said crucible is pivoted for pouring.

7. In a melting and casting arc furnace of the type having an enclosed housing forming a controlled ambient atmosphere, a crucible mounted in said housing in which conductive meltable material is to be melted, and a rotating nonconsumable electrode wheel disposed at the end of a shaft, an arc being drawn between the electrode wheel and the conductive meltable material in said crucible, the improvement comprising: pivotable mounting means disposed in said housing, said shaft being slidingly engaged with said pivotable mounting means, first propulsion means for sliding said shaft with respect to said pivotable mounting means on demand and second propulsion means for pivoting said pivotable mounting means on demand.

8. Apparatus according to claim 7 wherein said pivotable mounting means comprises a ball joint having a passage therein, said shaft being slidingly engaged with said passage.

9. Apparatus according to claim 7 wherein said pivotable mounting means is disposed in said housing outside of the vertical projection of said crucible.

10. Apparatus according to claim 7 comprising means pivoting said crucible on demand for pouring the melted material in said crucible, said pivotable mounting means being disposed in said housing over the region of the edge of said crucible from which melted material is poured when said crucible is pivoted for pouring.

* * * * *